C. H. ALBERT.
FELLY BAND AND RIM FOR WHEELS.
APPLICATION FILED NOV. 11, 1913.

1,093,234.

Patented Apr. 14, 1914.
2 SHEETS—SHEET 1.

WITNESSES:
L. B. Woerner.
A. G. Haehl.

INVENTOR:
Charles H. Albert,
By
Minturn & Worner
Attorneys.

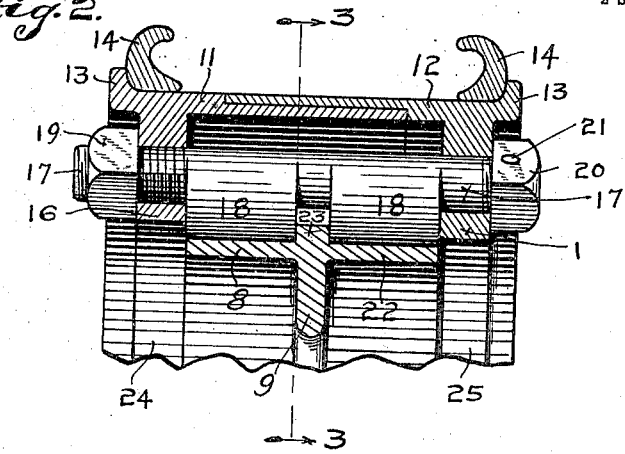
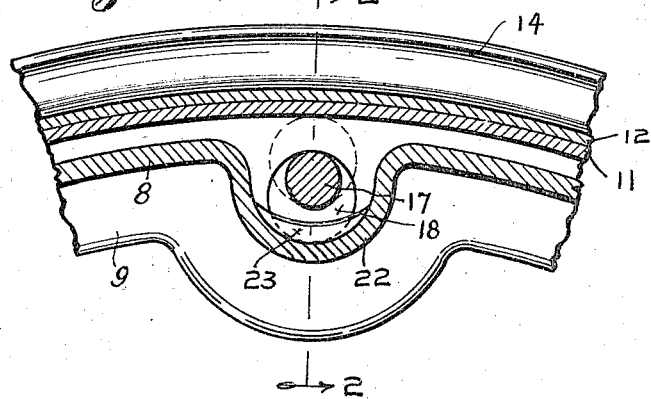
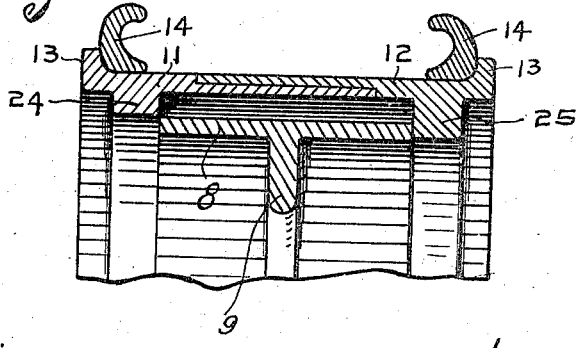

UNITED STATES PATENT OFFICE.

CHARLES H. ALBERT, OF INDIANAPOLIS, INDIANA, ASSIGNOR OF ONE-HALF TO EDWARD A. POTTER AND J. CARLYLE LUDS, BOTH OF INDIANAPOLIS, INDIANA.

FELLY-BAND AND RIM FOR WHEELS.

1,093,234.

Specification of Letters Patent.   Patented Apr. 14, 1914.

Application filed November 11, 1913.   Serial No. 800,278.

*To all whom it may concern:*

Be it known that I, CHARLES H. ALBERT, a citizen of the United States, residing at Indianapolis, in the county of Marion and State of Indiana, have invented certain new and useful Improvements in Felly-Bands and Rims for Wheels, of which the following is a specification.

The object of this invention is to provide a felly-band to be used on wheels with wooden fellies and also on metal wheels with wire spokes, in combination with a quickly demountable and separable rim, and eccentric clamps for locking the rim to the felly, which clamps will remain intact on the rim at all times so they cannot be lost.

I accomplish the above and other objects which will hereinafter appear, by the mechanism illustrated in the accompanying drawings, in which—

Figure 1:
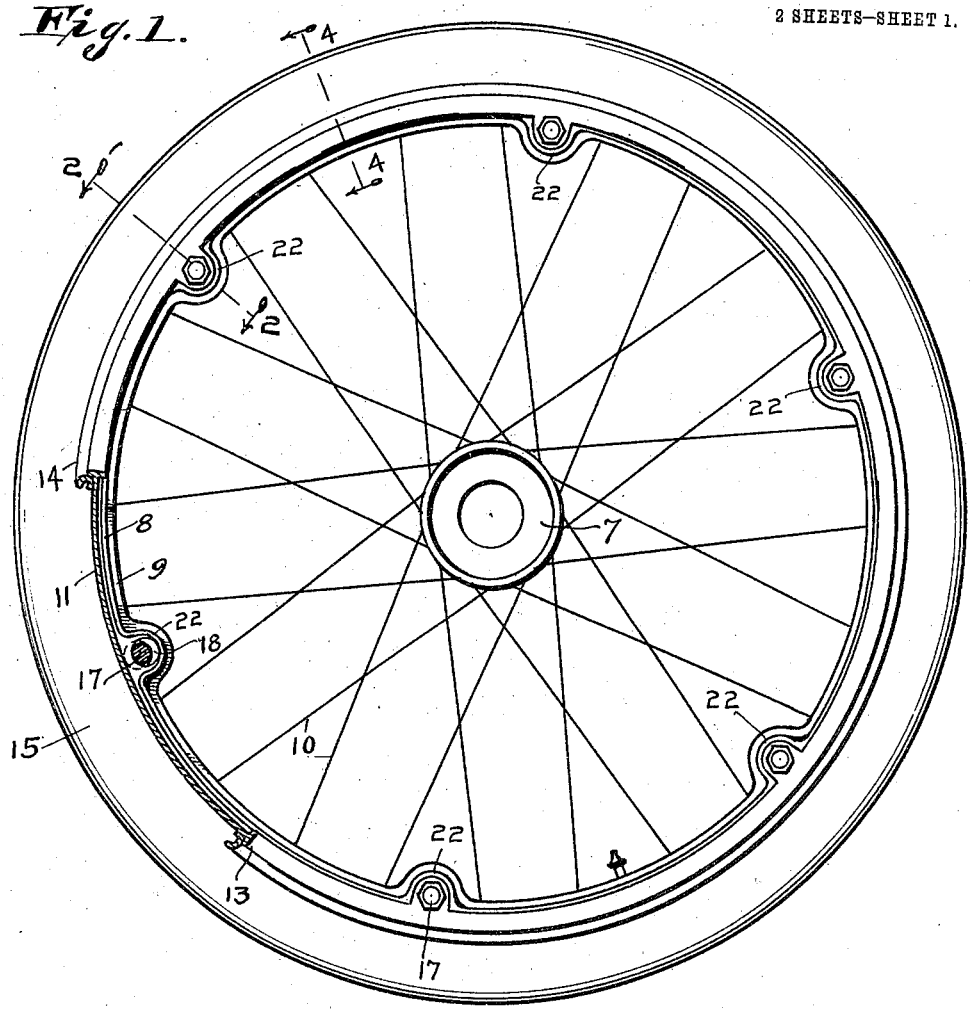
Figure 5:
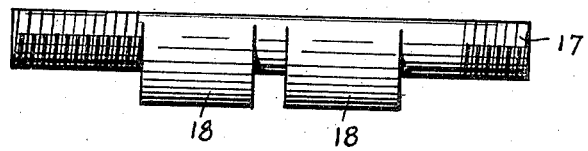
Figure 6:
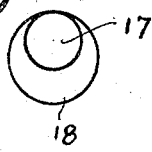

Figure 1 is a side elevation of a metal wheel with wire spokes embodying my invention, the rim being broken away in part to show the inside construction, including the felly-band. Fig. 2 is a cross section on the line 2—2 of Fig. 1. Fig. 3 is a vertical section on the line 3—3 of Fig. 2. Fig. 4 is a cross section on the line 4—4 of Fig. 1. Fig. 5 is a side elevation of a bolt with eccentric cylindrical portions forming cams, and Fig. 6 is an end view of the cam-bolt shown in Fig. 5. Figs. 2 to 6 inclusive are on a larger scale than that of Fig. 1.

Like characters of reference indicate like parts throughout the several views of the drawings.

While I have shown my invention as applied to an all-metal wheel with wire spokes, it is equally applicable to a wooden wheel, and for that reason I do not limit my invention to the kind of wheel shown, but desire that to be understood as here selected merely by way of illustration.

Referring to the drawings 7 is the wheel hub, 8 the felly-band which is here shown as having an inside annular flange 9, and 10 are wire spokes connecting the felly-band, or its flange 9, with the hub.

The rim is preferably formed in two annular sections 11 and 12, each of which have outwardly turned annular flanges 13 integral with their outer edges for securing the side rings 14 for securing the usual clencher and straight side tires, in the usual manner. A clencher tire 15 is shown on the wheel illustrated in Fig. 1. The rim is thus made into annular parts in order that said parts may be detached from each other to facilitate the removal and assembly of the tire 15, and to make this two-part rim structure firm and solid when assembled as a unit I reduce the diameter of the major inner portion of the section 11, and correspondingly increase the inside diameter of the section 12 so the said major and inner portions of the two sections will fit together telescopically, in the manner as is clearly illustrated in Figs. 2 and 4. By this construction the two jointed sections brace and support each other and for all practical purposes operate as a one-piece rim while supporting the tire and while the wheel is in use, but by the construction above described and as shown the two sections of the rim are readily detachable for tire manipulating purposes.

Both rim-sections 11 and 12 have an equal number of ears 16 extending inwardly and radially, and arranged in oppositely disposed pairs, which pairs are also equi-distant from each other measured circumferentially of the rim. I have shown six pairs of said ears 16 in the wheel illustrated in Fig. 1, but a greater or less number of ears may be used. Each pair of ears 16 is perforated to form the journals of a cam-bolt 17. Formed on the bolt 17 are two eccentric cylindrical enlargements 18. These are separated from each other sufficiently to receive a locking flange on the felly-band between them, but otherwise they occupy the entire space between the pair of ears 16, and in fact, act as spacers to aid in properly separating each pair of ears. The hole through the ear 16 on the rim-section 11 is preferably screw threaded and the correspondingly threaded end of the bolt 17 is screwed therein and retained by an outside nut 19 acting as a jam-nut. The opposite end of the bolt 17 is also screw-threaded to receive a nut 20 on that portion of it which projects outside of the ear on the rim-section 12. The hole in the ear 16 of section 12 is not screw-threaded. After the bolt 17 has been passed through the hole in ear 16 of section 12 and the nut 20 positioned on its projecting end, the nut is secured thereon against rotation by a pin or key 21, whereby the turning of nut 20 will correspondingly rotate the bolt 17 and its cams 18.

The bolts 17 are supported far enough in from the rim of the wheel to permit of their cams 18 being turned outwardly as shown in dotted lines in Figs. 1 and 3, and the felly-band 8 is formed with a semi-cylindrical inward bend or corrugation 22, concentric with the axis of the bolt 17, opposite each bolt, and of such diameter as to permit the cams 18 to move through it with a tight fit when the bolt 17 is turned to the position shown in full lines in Figs. 1, 2 and 3. In a wheel with wire spokes this corrugation or bridge 22 materially strengthens the wheel structure. Formed integrally with the felly-band inside of and midway of the ends of the bends 22 is a flange or rib 23 which enters the space between the pair of cams 18 on the bolt 17 and locks the bolt against longitudinal movement by contact with said cams.

By turning the bolts 17 so their cams 18 will be outward or against the rim-sections 11 and 12 the rim will be unlocked from the felly-band and remainder of the wheel and the rim can be demounted by a side movement. When it is desired to detach the rim-sections 11 and 12, this may be done by removing the nut 19 and then rotating the bolt until it is screwed out of the ear 16 of section 11. This operation when all of the bolts are thus unscrewed also unjoints the two sections telescopically and leaves the section 11 in condition to be moved away from the section 12.

Connecting the ears 16 are annular flanges 24 and 25. The flange 24 extends in to but does not overlap the felly-band 8 (see Fig. 4) thereby closing the space between the rim and band to exclude foreign matter from the space between them while permitting the band 8 to pass the flange in demounting the rim. The flange 25 extends farther inwardly of the wheel and overlaps the band, thereby even more effectually closing the space between the band and rim and also acting as a stop to aid in properly assembling the band in the rim.

While I have described my invention with more or less minuteness as regards details of construction and arrangement and as being embodied in certain precise forms, I do not desire to be limited thereto unduly or any more than is pointed out in the claims. On the contrary I contemplate all proper changes in form, construction, and arrangement, the omission of immaterial elements and the substitution of equivalents as circumstances may suggest or as necessity may render expedient.

I claim—

1. In a wheel, a rim, a plurality of cam-bolts extending transversely of and located on the side of the rim toward the axis of the wheel and rotatively secured to the rim, and a felly-band adjacent to the rim having indentations in which the bolts and cams are assembled and to which the rim is locked by the contact of the cams with said band.

2. In a wheel, a rim having inwardly projected ears in pairs, a bolt for each pair of ears journaled in holes in the ears, a pair of spaced-apart cams on each bolt and a felly-band adjacent the rim having indentations to receive the bolts and cams, each indentation having a rib transverse thereto to enter the space between said pair of cams.

3. In a wheel, a rim having ears in oppositely disposed pairs, a bolt for each pair of ears journaled in holes in the ears, a pair of spaced-apart cams on each bolt, a felly band adjacent to the rim receiving the bolts and cams between it and the rim and an external circumferential rib on the felly band to enter the space between said pair of cams when the cams are in contact with the felly band.

In witness whereof, I have hereunto set my hand and seal at Indianapolis, Indiana, this 30th day of October, A. D. one thousand nine hundred and thirteen.

CHARLES H. ALBERT. [L. S.]

Witnesses:
J. CARLYLE LEEDS,
EDWARD A. POTTER.